United States Patent [19]

Miszenti et al.

[11] 3,874,899

[45] Apr. 1, 1975

[54] PROCESS FOR THE PREPARATION OF POROUS MEMBRANES OR COMPOSITE BARRIERS FOR GASEOUS DIFFUSION INSTALLATIONS

[75] Inventors: Giorgio Szabò Miszenti; Carlo Alberto Nannetti, both of Novara, Italy

[73] Assignee: Montecatini Edison S.p.A., Milan, Italy

[22] Filed: Aug. 18, 1972

[21] Appl. No.: 281,801

[30] Foreign Application Priority Data

Aug. 24, 1971 Italy.................................. 27802/71

[52] U.S. Cl.................. 117/66, 117/98, 117/119.6, 117/123 R, 117/DIG. 9, 55/523, 55/524
[51] Int. Cl............................................. B05c 9/08
[58] Field of Search............. 117/98, 54, 66, 119.6, 117/123; 55/523, 524

[56] References Cited
UNITED STATES PATENTS

| | | | |
|---|---|---|---|
| 3,238,056 | 3/1966 | Pall et al................ | 117/99 X |
| 3,451,841 | 6/1969 | Kester et al.............. | 117/98 |
| 3,556,305 | 1/1971 | Shorr..................... | 117/98 X |
| 3,717,525 | 2/1973 | Bultemann................ | 117/98 X |

*Primary Examiner*—Stephen J. Lechert, Jr.
*Attorney, Agent, or Firm*—Stevens, Davis, Miller & Mosher

[57] ABSTRACT

A process is disclosed for the preparation of porous barriers or membranes of the composite type, consisting througout of sintered porous alumina, for applications in the field of gaseous diffusion, the process consisting:

in preparing a support of sintered porous alumina, preferably but not necessarily of tubular shape;

in then depositing on said support a microporous layer by filtering through the porous walls of said support an aqueous suspension containing submicronic particles of alumina and/or aluminum hydrates, preferably in concentrations of from 0.1 to 10 percent, and at least one hydrophillic ether of cellulose, preferably in concentrations of from 0.1 to 2 percent;

in carrying out the filtering from the inside towards the outside (in the case of a tubular support) and under a suitable pressure difference;

in eliminating the excess suspension from the inside of the support and by drying the layer;

in calcining in air the manufactured body thereby eliminating the combustible substances; and, in sintering in air said product, at temperatures exceeding 900°C, but preferably between 950° and 1,250°C, and possibly subjecting the microporous layer, after the calcination and before the final sintering, to cold compacting. The internal (inside) surface of said support, before the filtering operation, is preferably treated by dry rubbing with alumina powder and/or powders of other materials easily removable, such as for instance carbon black. The filtering operation and the subsequent calcination may be repeated in order to obtain microporous layers of greater thickness. The cold compacting operation is carried out by subjecting the manufactured body to an isostatic compression inside a suitable apparatus, said manufactured body being placed between two deformable tight-fitting membranes, of which the one pressing against the microporous layer is preferably made of pure natural unvulcanized rubber obtained from pure latex.

12 Claims, 1 Drawing Figure

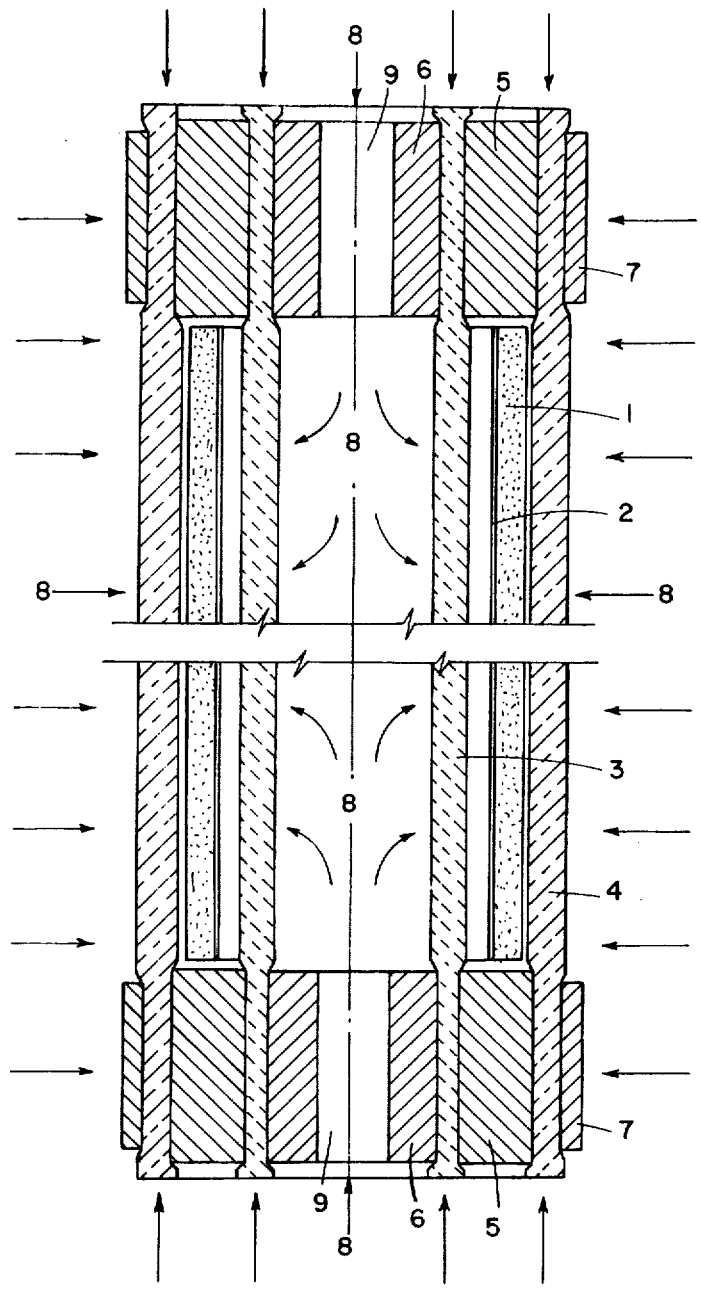

PROCESS FOR THE PREPARATION OF POROUS MEMBRANES OR COMPOSITE BARRIERS FOR GASEOUS DIFFUSION INSTALLATIONS

The present invention relates to a process for the preparation of composite barriers (or porous membranes) formed by a microporous layer fixed onto a support which may be called macroporous.

More particularly, the present invention relates to a process for the deposition of a microporous layer, obtained from submicronic alumina powder, on the inside walls of supporting tubes made of porous alumina.

The barriers or porous membranes suitable for the use in gaseous diffusion plants must display, amongst others, the following general characteristics: extremely reduced size of the pores and a high permeability.

Thus there arises the necessity to reduce as much as possible the thickness of the diffusing membrane which may be called microporous, in contrast with the obtention of manufactured articles having suitable mechanical characteristics. These characteristics may be achieved by forming said microporous layer on a supporting layer of greater thickness but having pores of much bigger size. Barriers of this latter type are called composite barriers.

Some types of alumina, for instance in the form of gels, have already been used for the preparation of barriers (either tubular or flat) for application in gaseous diffusion in general and for the isotopic enrichment of uranium in particular.

Microporous layers have also been obtained through the anodic oxidation of aluminum metal sheets or by pressing against certain supports, such as metal nets, etc., fine granules (of from one-hundredth to several hundredths of microns) of alumina, titanium oxide and other like materials.

Thus the main object of the present invention is that of providing composite barriers, for applications based on gaseous diffusion, that are made entirely of sintered porous alumina.

More particularly, one object of this invention is that of providing a process for the preparation of said composite barriers with uniform microporous layers adhering to the support and of a thickness adjustable according to operational requirements and, above all, that shall be free of faults such as flaws and/or disjunction or separation of the layer from the support.

These and still other objects, which will more clearly appear from the description that follows, are conveniently attained by means of a process which, according to this invention, comprises preparing a sintered porous alumina support, preferably of tubular shape; in depositing on said support a microporous layer by means of filtering through the porous walls of said support an aqueous suspension containing submicronic particles of alumina and/or of aluminum hydrates, preferably in concentrations bettween 0.1 and 10 percent, and of at least one methylcellulose (having varying degrees of methylization) or of other hydrophillic ethers of cellulose, preferably in concentrations between 0.1 and 2 percent, said filtering being effected from the inside towards the outside of the porous tubular support and under a suitable pressure difference; in eliminating the excess of suspension from the inside of the support and in letting the layer dry; in then calcining the product in the air until the combustible substances are eliminated, and then in sintering the product in the air at temperatures greater than 900°C, but preferably between 950° and 1,250°C, and if desired subjecting the microporous layer, after said calcination and before the final sintering, to a compacting under cold by means of isostatic pressing of the manufactured body.

More particularly, the process of this invention involves the use of a stabilized and degassed suspension and may require (in order to avoid the deposition of alumina powder inside the larger pores of the support) that the inside surface of said support, before the above-mentioned filtering operation, be suitably treated such as by dry-rubbing with very fine alumina powder or other such easily removable materials, e.g., carbon black or the like.

As already indicated, this invention involves the preparation of composite alumina barriers, preferably of the tubular type, that is, consisting of a porous alumina support and of a microporous alumina layer, fixed on the inside surface of the support. However, the process also contemplates (with obvious modifications or changes) forming the layer on the external surface of the tubular support, or to make composite barriers which are flat or otherwise geometrically shaped than tubular.

One type of alumina powder that, according to this invention, has yielded good results is a submicronic powder of gamma-alumina which is known under the trade name of "Alon" and is produced by the Cabot Company in the United States. This alumina powder is easily dispersed in water and the resulting suspension is sufficiently stable. The use of conventional dispersion techniques, for instance by means of ultrasonics, is convenient but not indispensable.

The deposit of the microporous layer inside the supporting tubes is, in practice, obtained by filtering with suitable expedients, to be described further on, an adequate quantity of a suspension of the above-mentioned type through the porous walls of the support.

In fact, it has been observed that the deposit obtainable by using a simple aqueous suspension of "Alon" suffers appreciable crackings during drying, and this drawback was also found in the aqueous suspensions of other powders, otherwise more or less suitable as regards their composition and degree of subdivision, and consisting of various types of alumina and alumina hydrates. Neither does the use of an anhydrous liquid medium lead to better results, due to the lesser tendency to form stable suspensions as well as the fact that the deposit thereby obtained turns out to be soft and poorly adherent. Moreover, the admixture of various additives and binders as well as the adjustment of the pH with acids or bases have not brought about any substantial improvements.

It has now been discovered that the presence of ethers of cellulose, such as methylcellulose and the like, in concentrations between 0.1 and 2 percent, in an aqueous suspension containing submicronic alumina particles and/or alumina hydrates and, preferably, "Alon" in concentrations between 0.1 and 5%, proved particularly effective for hindering the formation of cracks during drying of the layer deposited by filtering.

The deposition is carried out, according to this invention, by filtering said suspension from the inside towards the outside of the supporting tube, by means of a suitable pressure difference, e.g., a pressure difference between 0.05 and 1 atmosphere.

Throughout the entire filtering step it is preferred to keep the tube filled with the liquid suspension. It is also preferred that the suspension to be used shall be preliminarily degassed in a suitable way (e.g., under vacuum). It is quite easy to obtain the desired thickness for the deposited layer by establishing beforehand the quantity of liquid to be filtered by basing this on the concentration of the alumina in the suspension, on the inside surface area of the supporting tube and on the apparent (end) density of the material forming the microporous layer. The quantity of liquid passed through the walls of the support is more conveniently measured upstream of the support (for instance by a volumetric pump, by level drop, or by any other suitable system) instead of directly on the filtered liquid, in as much as it is preferred that the external (or downstream) surface of the supporting tube be continuously sprinkled or covered with water throughout the entire filtering step. At the end of the filtering step, the liquid present in the tube is discharged leaving behind the still wet deposit.

In order to avoid the possible drawback that the powder may tend to filter through the relatively big pores of the supporting tube, the internal surface of this latter may be suitably pretreated, i.e., before the filtering step, by rubbing onto it dry Alon powder so as to clog the entrance of the pores, the excess of powder then being removed by a jet of air. Alternatively, the entrance to the pores may be suitably clogged by using, instead of Alon, very fine powders of materials removable by combustion in the air, such as for instance carbon black or other like materials.

After drying, the layer is uniform, adherent, shiny and free of cracks, provided that its thickness is limited to not more than a few tens of microns.

The tube with the deposited layer is then calcined in the air (at temperatures between 500° and 800°C), so that the residual methylcellulose and the other added substances, if present, shall be removed.

The filtering and subsequent calcination may at this point be repeated if layers of still greater thickness are desired. In this way, the layer obtained in several stages proves to be still uniform and free of the faults that may be observed in the case of the direct deposition of a relatively great thickness (cracks, disjunction, etc.).

After sintering in air at temperatures between 950° and 1,150°C, the layer thus obtained shows a structure having an essentially open porosity with pores having an average radius around 150 A (measured with a mercury pososimeter). However, there is still present a considerable fraction (about 20% by volume) of definitely larger pores.

A dimensional distribution of the pores within a narrower range and centered around lower average values is obtained if, after calcination, the layer is subjected to a cold compacting (above 700 kg/sq. cm) before the above mentioned final sintering treatment. For this purpose, it is convenient to subject the product to an isostatic pressing that may be carried out by positioning the tube in an assembly apparatus of the kind described hereinafter for exemplification purposes in connection with the accompanying drawing.

In the sole FIGURE of the drawing there is schematically illustrated the assembly apparatus which consists of two sealing plugs 5, placed at the ends of the porous alumina supporting the tube 1, on the internal surface of which the microporous layer 2 has been deposited by means of the previously described technique; said microporous layer 2 is to be compressed against the supporting tube 1. The apparatus comprises, moreover, a deformable tubular membrane 3 inside the alumina tube (1+2), a tubular external membrane 4, also deformable, two rigid annular supports 6 with an inlet 9 for the pressurizing fluid 8 and two external rings 7. The annular supports 6 and the external rings 7 engage the membranes 3 and 4, respectively, with a force fit.

The whole apparatus is placed inside a vessel, not represented in the drawing, so that the pressure of the pressurizing liquid 8 may be uniformly applied over the whole apparatus (both externally as well as internally). In this way the deformable membranes 3 and 4 adjacent the inside and outside surfaces of the alumina tube (1+2), by insulating the pressurizing fluid, transmit the pressure in such a way as to compact the deposited layer 2 against the internal surface of supporting tube 1. As a result, the structure of the supporting tube too is subjected to compression and its resistance puts a limit to the maximum pressure applicable. It is not necessary to bleed the air that remains entrapped in the interspace between membranes 3 and 4 if the volume reduction during the compression does not involve a pressurization at too high values, considering the volume available inside the supporting material that is highly porous.

There are no particular restrictions on the type of material forming the external membrane 4 (e.g., elastic rubber tube) and contact with the supporting tube may if desired be easily avoided by the interposition of neutral or removable materials (powders or paper sheets or other material). On the other hand, the choice of the material constituting the internal tubular membrane 3, operating on the deposited layer 2, is quite critical.

Many materials (e.g., natural vulcanized rubber, silicone rubber, para rubber, etc.) tend to strongly stick to layer 2 and cause its separation or its alteration in the decompression phase or during disassembling. Non-vulcanized natural rubber obtained from pure latex proved to be one of the most suitable materials. Materials such as cellophane or polyethylene, although showing a limited adhesiveness, are more difficult for use directly as tight and deformable tubular membranes. Thin sheets of such materials may be used with advantage for isolating the internal tubular membrane from the layer undergoing compaction in as much as they are relatively easy to detach or easily removable by calcination.

However, it is more convenient to interpose a removable material in the powdery state (such as carbon black, etc.). At the end of the compressing step, this material appears to be compacted against the alumina layer and is then eliminated by combustion during the subsequent step of treatment in air at high temperature. On the other hand, it is advisable to minimize the quantity of powder used for this insulation for the purpose, amongst others, of not altering unnecessarily the purity of the layer. As a practical matter, it has been discovered that in order to avoid the adhesion of the membrane to the deposited layer, it is sufficient to cover its surface with carbon black, for instance by means of the simple step of dry rubbing.

The pores obtained after compacting at 460 kg/sq. cm and after the subsequent sintering in air at 1,050°C (for 3 hours) proved to be essentially monodispersed and to have a mean diameter smaller than 250 A. Similarly, compacting at 1,000 kg/sq. cm leads to a mean diameter lower than 200 A. Compacting at greater pressures causes a further reduction of the mean diameter of the pores (e.g., about 120 A at 4,000 kg/sq. cm and sintering at 1,000°C).

The following detailed working examples still further illustrate the invention:

EXAMPLE 1

There was first prepared an aqueous suspension containing 20 mg/cc of a very fine alumina of the type "Alon" made by the Cabot Corp., U.S.A., having a specific surface area of 100 m²/g.

Separately, there was prepared a clear aqueous solution of Methocel MC 4000 (Dow Chemical Co., U.S.A.) in a concentration of 5 mg/cc. The Methocel MC 4000 is a dimethylether of cellulose, containing from 27.5 to 31.5 percent of methoxy groups and having a viscosity of about 4,000 cP (measured as a 2 percent aqueous solution at 20°C). To this was then added, with constant stirring, an equal volume of the above-described Alon suspension, thereby obtaining a homogeneous final suspension containing about 10 mg/cc corresponding to about 1 percent of Alon and to 2.5 mg/cc of Methocel MC 4000.

This homogeneous final suspension was then degassed at room temperature in a vessel in which there was gradually obtained a vacuum corresponding to a residual pressure of about 40 mm Hg absolute.

A supporting tube, having an outside diameter of 1.8 cm, a thickness of 0.15 cm and a length of 37 cm, and made of sintered porous alumina characterized by an open porosity of 46 percent and with a mean pore diameter of about 3 microns, was imbued with water by filling and subsequent emptying. Thereupon, while maintaining it in a vertical position, the supporting tube was completely filled up from below with the above-described degassed suspension. As soon as all the air had been discharged through the upper end of the tube, that end was sealed and the tube was placed in a horizontal position, while the degassed suspension was continuously fed in at the other end of the tube (under a head of 1.5 m of water column) through a tightly fitting feed pipe. After 40 cc of the suspension had filtered through, the tube was again brought back into the vertical position, the feeding of the suspension was interrupted, the upper end of the tube was opened, and the suspension contained in the tube was discharged through the lower end of the tube.

After drying at room temperature, the tube was gradually heated in a muffle furnace up to 650°C in a period of 4 hrs., and was then maintained at that temperature for 45 minutes. After a slow cooling down in the muffle furnace, the tube was assembled as described above, for the compacting of the layer against the inside wall of the supporting tube.

This compacting is carried out by applying a gradually increasing pressure up to a maximum of 1,000 kg/sq. cm. Thereupon the pressure is released, and the tube is removed from the assemblage. It is again heated up in air at 1,050°C and maintained at that temperature for 3 hours, whereafter it is left to cool down to room temperature in the oven itself.

The layer thus obtained shows a mean thickness of about 20 microns and is characterized by an open porosity of about 65 percent, with a narrow pore size distribution, the mean diameter of the pores being smaller than 200 A.

EXAMPLE 2

A disc of sintered porous alumina (diameter 2.6 cm, thickness 0.5 cm) with pores having a mean diameter of 3 microns and an open porosity of 45 percent, was rubbed on one of its faces with a cotton wadding buffer, between which and the disc had been placed some Alon powder. After removing with an air jet the excess powder, the quantity fixed in the surface cavities of the disc was about 1 mg/sq. cm of the surface area. The disc was then introduced into an annular rubber container so as to ensure a tight fit with the lateral surface of the disc. It was then carefully imbued with distilled water. On its upper face, after it had been treated with Alon powder, 2 cc of an aqueous Alon suspension of 2.5 mg/cc concentration, containing 2.5 mg/cc of Methocel MC 4000, were uniformly distributed over it, said Methocel MC 4000 having been prepared according to the procedure described above in Example 1. At this point, the underface of the disc was subjected to a vacuum of 400 mm Hg and through it the liquid was permitted to filter. The disc was then extracted from the annular rubber container and left to dry in the air, whereupon it was slowly heated up to 700°C in the air and then finally was slowly cooled down to room temperature.

The layer thus obtained was then compacted against the support by mechanical compression, at a pressure of 460 kg/cm² applied normally with respect to the plane of the disc, and while interposing between the disc and the upper and lower metal plates of the press a para rubber layer 5 mm thick, in turn insulated from the disc by a cellophane layer 0.04 mm thick.

The disc was then treated in the same way as that described above in Example 1, at 1,050°C for 3 hours, in air.

The layer thus obtained showed a thickness of about 10 microns, and displayed an open porosity of about 70 percent, with a mean pore diameter of 230 A.

EXAMPLE 3

Following the procedures described in Example 1, there was prepared a suspension containing 2.5 mg/cc of Alon and 1 mg/cc of Methocel MC 4000. Proceeding as already described in Example 1, 80 cc of suspension were made to filter from the inside towards the outside of an identical supporting tube which was subsequently treated as described in that example.

The layer thus obtained showed characteristics similar to those of Example 1, with an average thickness of about 10 microns.

EXAMPLE 4

Here the procedure was the same as in Example 1, but using a suspension containing 10 mg/cc of Alon and 10 mg/cc of Methocel MC 25 of the Dow Chemical Co. Methocel MC 25 is a dimethylether of cellulose, having a viscosity between 20 and 30 cP in a 2 percent aqueous solution at 20°C.

The layer thus obtained showed characteristics similar to those found in Example 1.

EXAMPLE 5

Here the procedure was again as in Example 1, but using a suspension containing 7.5 mg/cc of Alon and 5 mg/cc of Methocel 65 HG 4000 of the Dow Chemical Co. This Methocel is a cellulosic methylether in which the methoxy (—OCH₃) groups are partially replaced by propylene glycol (—OCH₂.CHOH.CH₃) groups. It contained 27–29 percent of methoxy groups and 4–7.5 percent of propylene glycol groups. The viscosity of this Methocel was between 3,500 and 5,600 cP in a 2 percent aqueous solution at 20°C.

The layer thus obtained still showed characteristics similar to those found in Example 1, with a mean thickness of about 15 microns.

EXAMPLE 6

The procedure of Example 1 is repeated except that, in compacting the layer against the internal wall of the supporting tube, a pressure increasing up to 2,000 kg/cm² is applied, and the temperature of the final heat treatment is 1,000°C.

The microporous layer obtained in this case has an average thickness of about 18 microns, and an open porosity of about 60 percent, with a narrow pore size distribution, and an average pore diameter of less than 170 Å.

EXAMPLE 7

The procedure of Example 1 is repeated except that the supporting tube is composed of two layers of porous sintered alumina, of which the external layer has a thickness of 0.14 cm, and is characterized by an open porosity of about 40 percent and an average pore diameter of about 7 microns, while the internal layer has a thickness of about 0.01 cm, and an average pore diameter of about 2 microns.

The microporous layer obtained in this case has the same characteristics as in Example 1.

What is claimed is:

1. A process for the preparation of porous barriers or membranes of the composite type, consisting essentially throughout of sintered porous alumina, said process comprising:
   a. preparing a support of sintered porous alumina;
   b. depositing on said support a microporous layer by filtering through the porous walls of said support under a suitable pressure difference an aqueous suspension containing submicronic particles of a material selected from the group consisting of alumina and aluminum hydrates and at least one hydrophillic ether or cellulose;
   c. eliminating the excess suspension from the upstream side of the support and letting the resulting layer dry;
   d. calcining the resulting manufactured article in air until the combustible substances are eliminated;
   e. sintering the article in air at temperatures exceeding 900°C, and subjecting the microporous layer, after the calcination and before the final sintering, to a cold compacting step.

2. A process according to claim 1, wherein the porous alumina support of (a) is tubular in shape and the filtering step of (b) is carried out in a direction from the inside toward the outside of the tubular shape.

3. A process according to claim 1, wherein the concentration of the submicronic particles in the aqueous suspension of (b) is from 0.1 to 10 percent.

4. A process according to claim 1, wherein the concentration of the cellulose ether in the aqueous suspension of (b) is from 0.1 to 2 percent.

5. A process according to claim 1, wherein the sintering temperature of (e) is between 950° and 1,250°C.

6. A process according to claim 1, wherein the aqueous suspension of (b) contains methylcellulose of varying degrees of methylation.

7. A process according to claim 1, wherein the upstream surface of said support, before said filtering step, is subjected to a dry rubbing with a material selected from the group consisting of alumina powder and easily removable powders of other materials.

8. A process according to claim 7, wherein the powder employed in the dry rubbing step comprises carbon black.

9. A process according to claim 1, wherein the filtering step and the subsequent calcination are repeated in order to obtain microporous layers of greater thickness.

10. A process according to claim 1, wherein the cold compacting step is carried out by subjecting the manufactured article to an isostatic compression inside a suitable apparatus, said manufactured article being placed between two deformable tight-fitting membranes, of which the one facing the microporous layer is made of pure natural unvulcanized rubber obtained from pure latex.

11. A process according to claim 1, wherein the cold compacting step is carried out at a pressure greater than 400 kg/sq. cm.

12. A process according to claim 1, wherein the calcination step of (d) is carried out at between 500° and 800°C.

* * * * *